US005752729A

United States Patent [19]

Crozier et al.

[11] Patent Number: 5,752,729

[45] Date of Patent: May 19, 1998

[54] VACUUM LIFTING DEVICE

[75] Inventors: Christopher Luke Crozier; Brian Joseph Liston; Karl William Stewart, all of Victoria, Australia

[73] Assignee: Comalco Aluminium Limited, Melbourne, Australia

[21] Appl. No.: 635,969

[22] PCT Filed: Nov. 4, 1994

[86] PCT No.: PCT/AU94/00677

§ 371 Date: May 29, 1996

§ 102(e) Date: May 29, 1996

[87] PCT Pub. No.: WO95/12541

PCT Pub. Date: May 11, 1995

[30] Foreign Application Priority Data

Nov. 4, 1993 [AU] Australia ................................ PM2223

[51] Int. Cl.[6] ................................ B25J 15/06; B66C 1/02

[52] U.S. Cl. ................................ 294/2; 294/64.1; 414/627; 414/730

[58] Field of Search ................................ 294/2, 64.1–65, 294/67.31, 81.51, 81.21, 907; 414/627, 730, 737, 752; 901/40, 46

[56] References Cited

U.S. PATENT DOCUMENTS 2,783,078 2/1957 Billner ........................................ 294/65
3,387,718 6/1968 Roth et al. .................................. 294/2
4,828,304 5/1989 No et al. ..................................... 294/2
5,024,575 6/1991 Anderson .................................... 294/2

*Primary Examiner*—Dean Kramer
*Attorney, Agent, or Firm*—Nikaido Marmelstein Murray & Oram, LLP

[57] ABSTRACT

A vacuum lifting device that is particularly suitable for lifting refractory slabs used to line aluminum smelting cells incudes suction cups which engage the object to be lifted. A plurality of mechanical supports can be moved so that they extend at least partly underneath the object being lifted when the object is raised from the ground. The mechanical supports can hold the object in case of vacuum failure and improve the safety of the device. An optional automatic override can ensure that the mechanical supports are in the down position in the case of vacuum failure.

40 Claims, 6 Drawing Sheets

FIG. 4
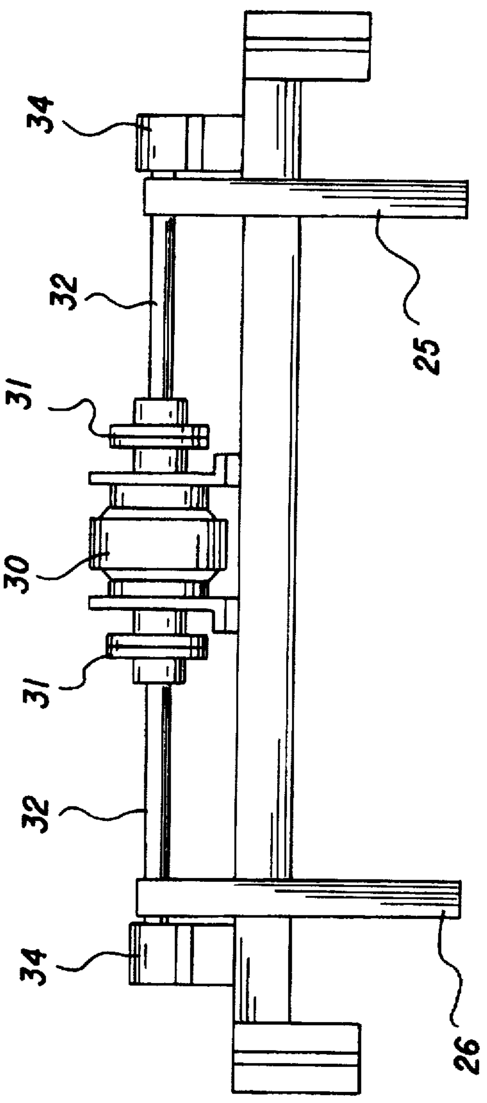
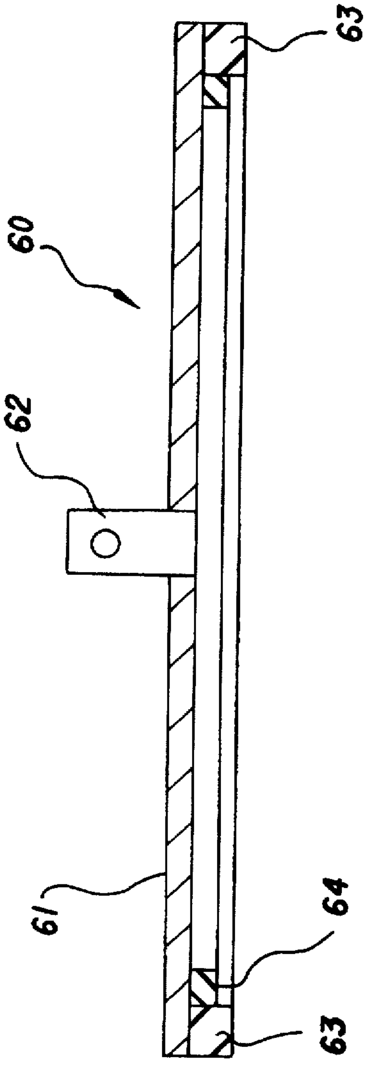
FIG. 7

VACUUM LIFTING DEVICE

The present invention relates to a vacuum lifting device for lifting and manoeuvring heavy objects. The vacuum lifting device of the invention is particularly suitable for lifting slabs of material and, for convenience, the present invention will be hereinafter described with reference to the lifting of slabs. However, it will be appreciated that the device of the present invention is not to be considered to be limited to the lifting of slabs.

The production of aluminium metal is carried out in aluminium smelting cells. Each cell includes a steel shell that is lined with various refractory and carbon linings. The refractory linings of the steel shell are used to protect the shell from the high temperatures generated during operation of the cell and to provide a barrier between the steel shell and the corrosive contents of the aluminium smelting bath. Conventional practice for lining aluminium smelting cells involves placing a layer of refractory bricks on the base of the cell and subsequently adding further layers, such as cathode carbon, above the refractory bricks. Preparation of the layer of refractory bricks is a time-consuming and expensive job that requires careful laying of the bricks. Furthermore, refractory packing or refractory mortar has to be placed between each brick in order to reduce the possibility of the corrosive bath infiltrating through the refractory layer and attacking the steel shell.

In order to reduce the time required to reline an aluminium smelting cell, recent developments have involved the use of large, precast refractory slabs being placed on the floor of the cell. These refractory slabs, which may weigh between 700 to 3,000 kilograms are sized such that only a small number are required to cover the floor of the cell. This obviously reduces the number of joints in the refractory layer that have to be packed with packing or adhesive. However, the use of precast refractory slabs involves the manoeuvring of large, heavy objects into place which causes difficulties for the operators engaged in relining the cell.

It has been common for the operators to position the refractory slabs in the cell by raising the slabs with chains or hooks connected to a crane and subsequently manoeuvring the crane to place the slab in the desired position. However, this method of lifting and manoeuvring the slabs has several drawbacks, the chief one being that as either chains or hooks extend around and project from the outer periphery of the slabs, it is almost impossible to place a slab in a close fit with an adjacent slab. In order to obtain a close fit between slabs, which minimises the packing required between slabs, it has been necessary to put a slab down on the floor of the cell and subsequently have the operators move the slab sideways, for example, by the use of crowbars. Difficulties are also encountered in placement of the final slab in the cell, as this slab cannot be fitted flush into the space remaining on the floor of the cell. Consequently, the final slab partly rests on another slab until it is moved sideways by the operators and drops into place.

Vacuum lifters have been in use for a number of years and generally consist of a set of suctions cups connected to a vacuum source, the suction cups also being attached to a crane assembly to enable the cups to be raised, manoeuvred and lowered. Although they operate satisfactorily in their intended uses, known vacuum lifters do not include stringent safety features to prevent dropping of the object being lifted in the event of failure of vacuum or a suction cup. Accordingly, known vacuum lifters are not suitable for use in a plant environment, such as an aluminium smelter, due to occupational safety reasons.

It is an object of the present invention to provide a vacuum lifting device having improved safety when compared to vacuum lifters known to the applicants. In a first aspect, the present invention provides a vacuum lifting device for lifting heavy objects comprising a first set of suction cups connected to a source of vacuum, said first set of suction cups adapted to be placed in engagement with a surface of an object to be lifted and to releasably connect to the object when vacuum is applied to the first set of suction cups, a plurality of mechanical supports operable in use to move from a first position wherein said mechanical supports are clear of the object being lifted to a second position wherein said mechanical supports extend at least partly underneath the object when said object is lifted, said mechanical supports being capable of holding said object in the event of vacuum failure, mechanical support control means to operate said mechanical supports from the first position to the second position after said object is lifted and to retract the mechanical supports prior to releasing the object, safety control means including monitoring means for monitoring the level of vacuum in the suction cups and automatic position control means to position the mechanical supports in the second position if the monitored level of vacuum in the suction cups falls below a predetermined level said device being adapted to be connected to or being operatively connected to lifting means.

Preferably, the device of the present invention further includes a second set of suction cups connected to a second source of vacuum, said second set of suction cups being adapted to be placed in engagement with a surface of the object to be lifted and to releasably connect to the object when vacuum is applied to the second set of suction cups.

In cases where the vacuum lifting device of the present invention includes two sets of suction cups, it is preferred that each set of suction cups are able to support the object being lifted by itself. If this is the case, the lifting device has sufficient capacity to hold the object being lifted even in the event of failure of one of the sources of vacuum.

Preferably, one or both sets of suction cups are also connected to a reservoir of vacuum pressure, which reservoir has sufficient vacuum capacity to enable the suction cups to continue holding the object for a period of time sufficiently long to enable the object to be lowered in the event of a failure in the vacuum supply. Preferably, the reservoir of vacuum pressure is an accumulator. Preferably, each set of suction cups is connected to separate reservoirs of vacuum pressure.

Preferably, the automatic position control means includes position determining means to determine the position of the mechanical supports and means to position the mechanical supports in the second position if the position determining means determines that the mechanical supports are not in the second position, said automatic position control means being operable to maintain the mechanical supports in the second position if the position determining means determines that the mechanical supports are in the second position. It will be appreciated that the automatic position control means operates on the mechanical supports if the monitored level of vacuum falls below a predetermined level.

The safety control means act as an automatic override that operates in cases where the level of vacuum in the suction cups falls below a minimum predetermined level. It will be appreciated that if the level of vacuum in the suction cups falls below the predetermined level, the risk of dropping of the object being lifted increases greatly. In such a situation, the safety control means automatically position or maintain the mechanical supports in the second position wherein the mechanical supports extend at least partly under the object being lifted. In this configuration, if the suction cups can no longer hold the object being lifted, the object will drop from the suction cups and come to rest on the mechanical supports which will then hold the weight of the object until it can be lowered to the floor.

Preferably, the predetermined level of vacuum at which the safety control means automatically overrides the movement of the mechanical supports is set to ensure that the reserve vacuum in the reservoirs of vacuum cannot be exhausted without the mechanical supports being in the second position.

The mechanical supports are designed to support the object being lifted in case of failure in the vacuum system. In normal use, the mechanical supports provide a back-up safety system. It is preferred that the mechanical supports return to the second position in the unpowered state. This may be achieved, for example, by spring biasing the mechanical supports to the second position. Alternatively, air-actuated actuators propelled by a separate air reservoir cause the actuators to move to the second position in order to ensure that the mechanical supports fail closed. In operation of the vacuum lifting device, the mechanical supports must be driven out of the second position to the first position in order to enable the object to be lifted to be engaged by the suction cups. The mechanical supports may be driven out of position by the use of air cylinders, for example. Once the object has been lifted clear of the ground by the suction cups, the mechanical supports are then returned by the operator to the second position in which the mechanical supports extend at least partly underneath the object being lifted.

In normal operation, control of the mechanical supports is provided by the mechanical support control means. Preferably, the mechanical support control means includes a dead-man button that must be pressed in order to drive the mechanical supports from the second position to the first position. Release of the dead-man button after the object has been lifted returns the mechanical supports to the second position. Use of a dead-man button, which must be closed in order to move the mechanical supports out of the second position, provides a further safety feature on the lifting device.

Each mechanical support preferably includes an L-shaped or C-shaped member pivotally mounted at one end thereof to the device. An air actuator or spring or other biasing means is used to bias the support to the second position. Drive means, such as a pneumatic cylinder, is associated with the support to drive the mechanical support from the second position to the first position. It is preferred that the part of the mechanical support that extends underneath the object being lifted is in close proximity to the object being lifted so that the object will not fall a great distance in the event of vacuum failure before it is supported by the mechanical supports.

The vacuum lifting device of the present invention preferably includes a chassis to which the suction cups and the mechanical supports are mounted. The chassis preferably is a skid arrangement.

In a preferred embodiment, the chassis of the vacuum lifting device is of adjustable dimensions in order to enable different sized objects to be lifted. This is preferably achieved by constructing the chassis such that the part of the chassis to which the mechanical supports are mounted is adjustable in at least one dimension. This will enable the spacing between each bank of supports to be adjusted so that the supports can extend around the objects being lifted and this will enable lifting of differing size objects to be accommodated. The arrangement of the vacuum cups preferably does not change with this arrangement.

In this embodiment, the mechanical supports may be mounted to a part of the chassis that includes adjustable members. For example, the part of the chassis upon which the mechanical supports are mounted may include one or more telescoping members, and these may be formed by mounting rails or channels inside larger channels to enable relative slidable motion therebetween.

The mechanical supports may also be able to be adjusted to accommodate objects of differing thickness. For example, if an object, such as a refractory slab used in the lining of aluminium smelting cells, is of lesser thickness than the design thickness of the mechanical supports, blocks or other padding may be placed upon the supports so that they sit closer to the thinner object when in the lowered position.

The vacuum lifting device is preferably configured such that it can be attached to a crane hook in order to enable lifting, manoeuvring and lowering of the device and objects being lifted.

As mentioned earlier, the vacuum lifting device of the present invention is especially suitable for the lifting and manoeuvring of slabs of material, for example, refractory slabs used to line aluminium smelting cells. It is preferred that the arrangement of the suction cup supporting the refractory slabs shall ensure even distribution of the slab weight. The suction cups should preferably evenly and symmetrically support the slab weight. In cases where the vacuum lifting device includes two sets of suction cups, each set of suction cups should be arranged such that the suction cups of that set will evenly and symmetrically support the slab weight in the event of failure of the other set of suction cups. The suction cups are preferably arranged such that tensile stresses in the refractory slabs are minimised during lifting to prevent cracking of unreinforced sections of slab.

The suction cups are preferably sized to have a minimum safety factor of 4 for normal operational lifting. In the case of one of the vacuum systems failing, the remaining set of suction cups can have a reduced minimum safety of 2.

It is preferred that the individual cups be designed to ensure that in no manner can they draw a substantially greater air flow than the designed amount and hence deplete other cups in the system of their design flow. This will assist in ensuring that a poor seal on one cup cannot overload a single cup while derating others in its set, which would allow lifting to proceed with the slab unevenly supported with the attached cups operating beyond the intended safety factor.

Those skilled in the art will appreciate that the suction cups should be designed to ensure that a sound connection is achieved between the cup and the object being lifted when vacuum is applied.

The source of vacuum connected to the sets of suction cups may be of any configuration known to be suitable in the art. For example, the source of vacuum may be air driven, in which case it is preferably configured as an ejector. Alternatively, the source of vacuum may comprise an electric vacuum pump or a vacuum motor.

It is preferred that the suction cups, the mechanical supports and all ancillaries are to be mounted onto the chassis of the vacuum lifting device so that, apart from possibly the power supply, it is a self-contained unit. The vacuum attachment area is to be on the underside of the unit and a hook-on arrangement of the top of chassis is provided to allow overhead cranes to pick up the chassis.

The chassis will then function as an attachment to an overhead crane. The crane will manipulate the lifting device as required.

A preferred embodiment will now be described with reference to the drawings, in which:

FIG. 1 which shows a schematic view of the vacuum lifting device of the present invention;

FIG. 4 shows an actuator for manipulating the safety clamps of the vacuum lifter.

FIG. 7 is a side sectional view of a double-sealed vacuum cup suitable for use in the invention.

Figure 1:
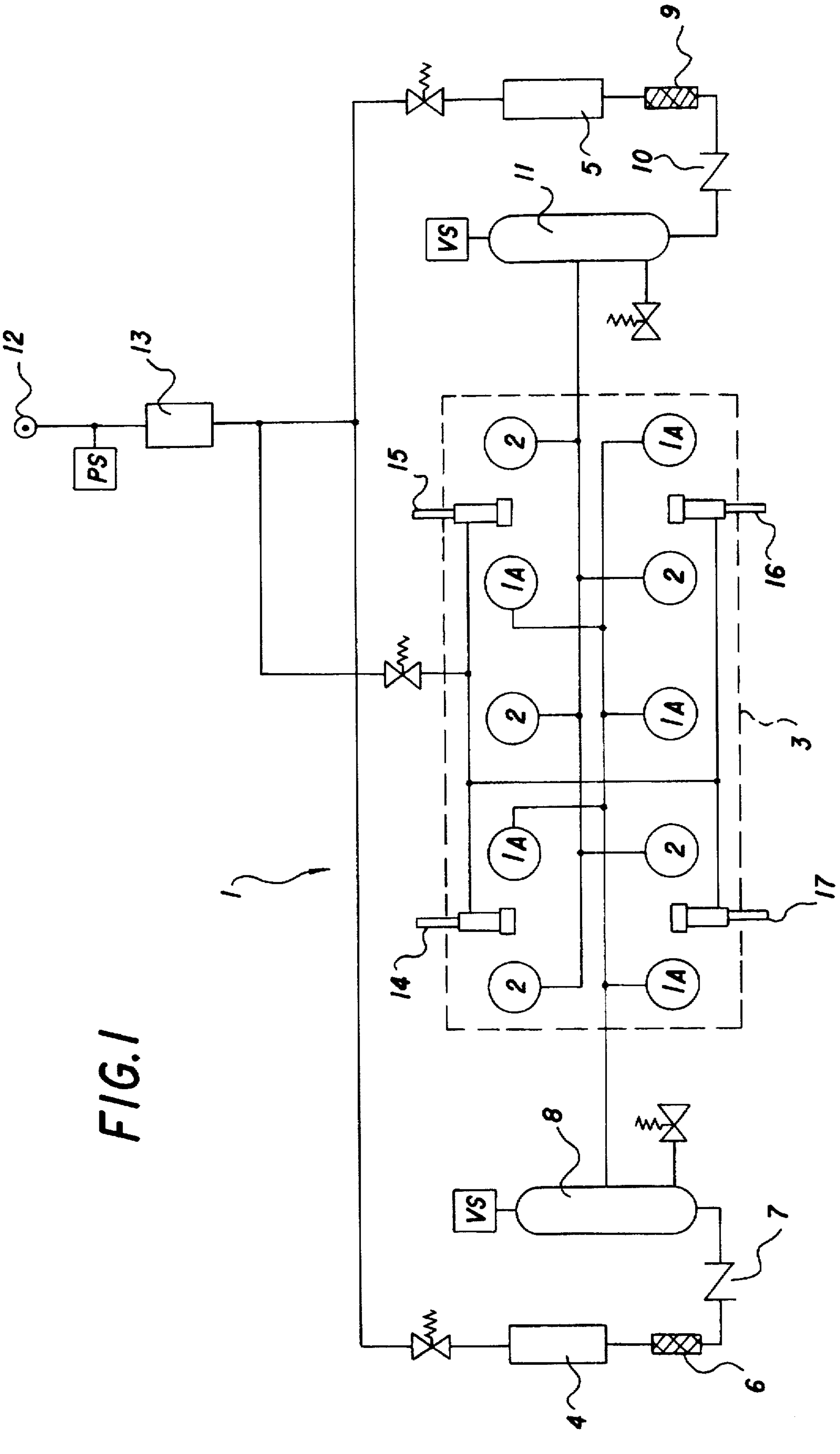

Referring to FIG. 1, the vacuum lifting device 1 includes two sets of suction cups la and 2. The suction cups are mounted to a chassis, shown schematically in FIG. 1 at reference numeral 3. Respective vacuum pumps 4 and 5 are connected to suction cups 1*a* and 2. Vacuum pump 4 is connected to suction cups la via filter 6, check valve 7 and vacuum reservoir 8. Similarly, vacuum pump 5 is connected to suction cups 2 via filter 9, check valve 10 and vacuum reservoir 11. The vacuum pumps 4 and 5 are powered by compressed air which is supplied from customised air supply 12 and air service unit 13. The lifting device 1 also includes mechanical supports 14, 15, 16 and 17. The mechanical supports comprise L-shaped arms or C-shaped arms that are pivotally mounted to chassis 3 and biased to the lower position by pneumatic actuators powered by an air reservoir back-up wherein the mechanical supports extend at least partly underneath the object to be lifted. Air cylinders are also associated with each of the mechanical supports and the air cylinders act to drive the mechanical supports to an upper position in which the supports are clear of the object being lifted.

The vacuum lifting device shown in FIG. 1 is for use in the lifting and manoeuvring of refractory slabs used to line aluminum smelting cells.

Figure 2:
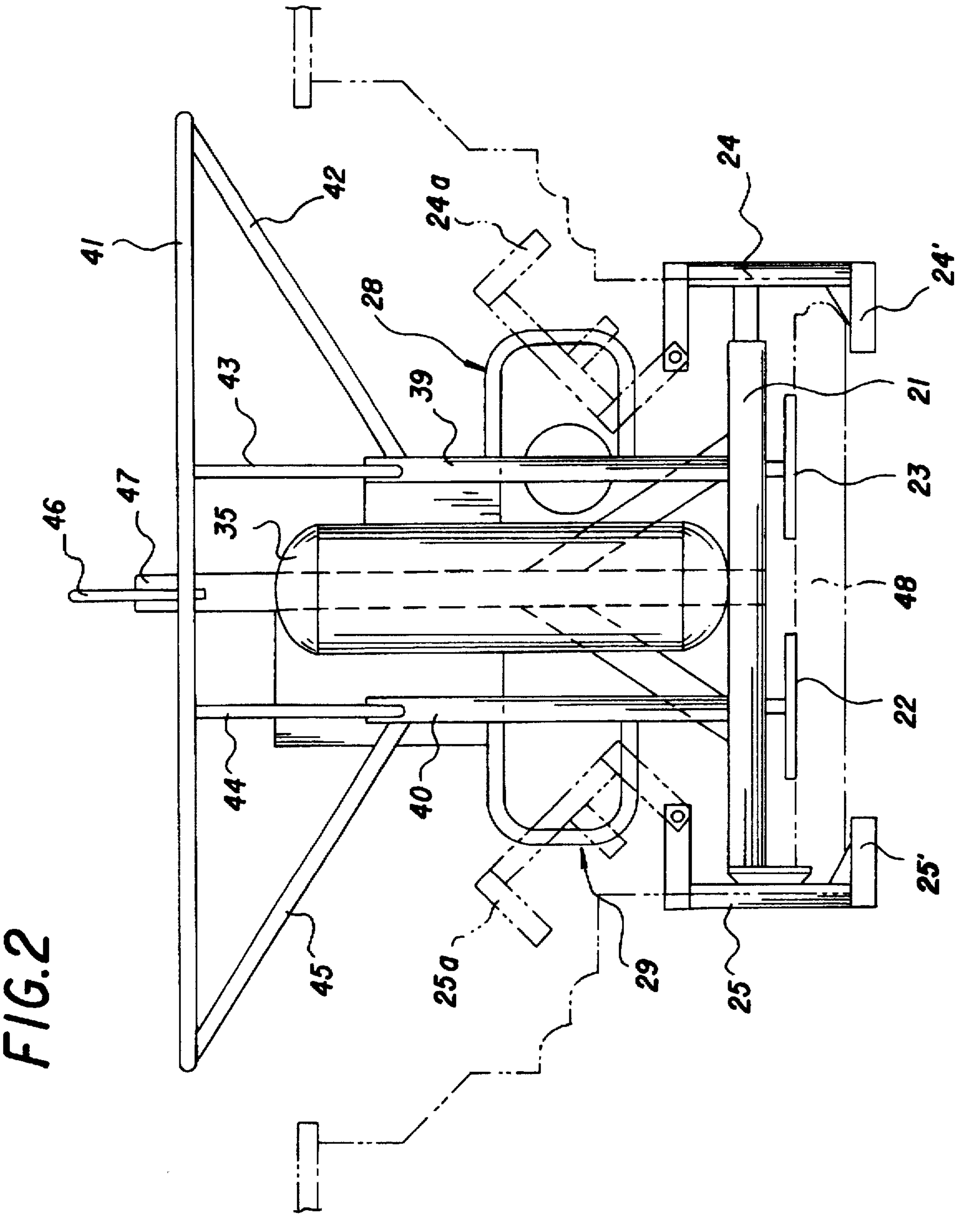
FIG. 2 shows a side elevation view of a vacuum lifter in accordance with the present invention.
Figure 3:
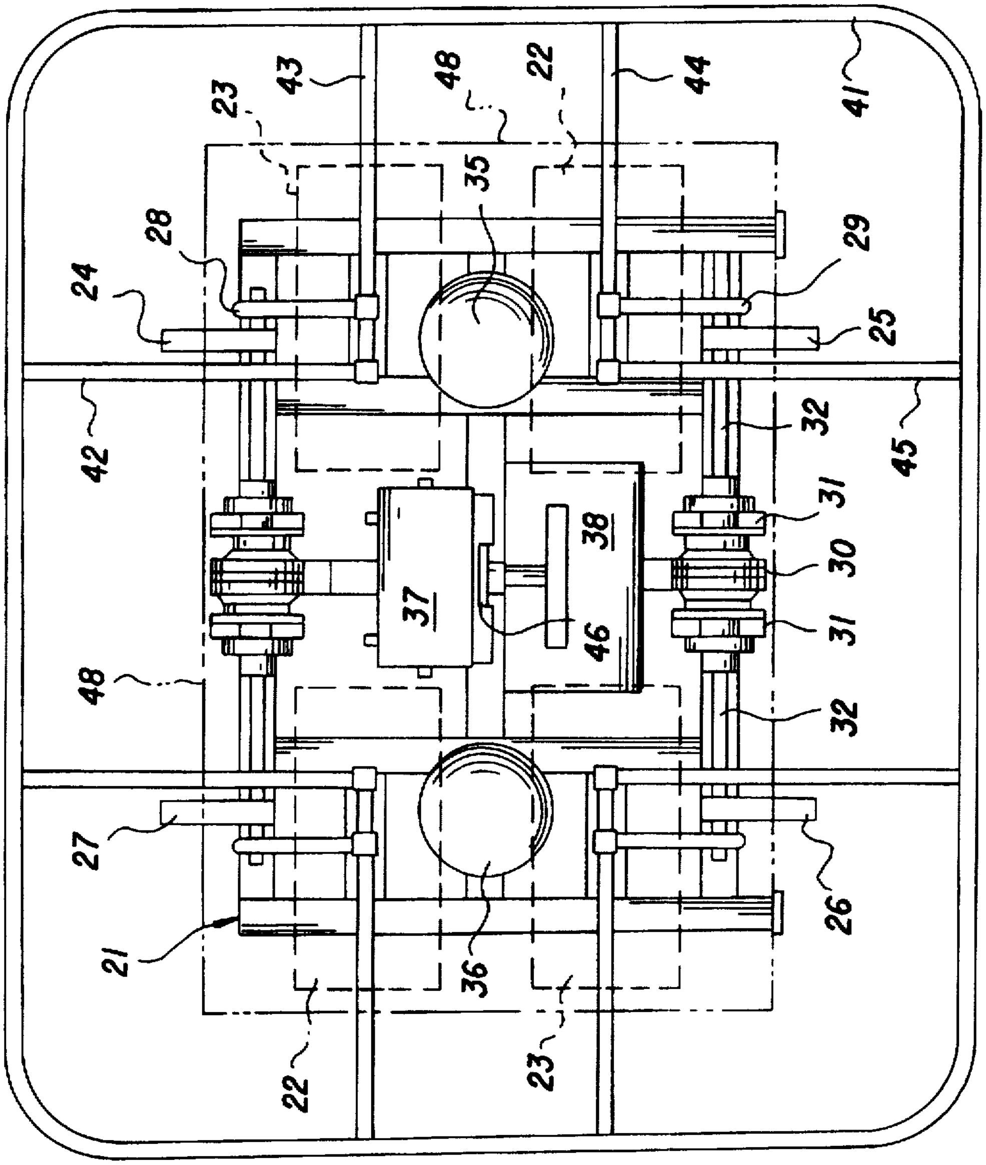
FIG. 3 shows a plan view of the vacuum lifter of FIG. 2.

A side elevation and plan view of the vacuum lifting device are shown in FIGS. 2 and 3, respectively. The device includes a chassis having a base frame assembly 21 upon which the other parts of the device are mounted or connected. Suction cups 22,23 are mounted underneath the chassis. In FIG. 3, the suction cups are shown in dotted outline. The suction cups include two sets of cups connected to separate sources of vacuum in accordance with the diagram shown in FIG. 1. All ancillaries for the vacuum lifter are mounted on the chassis so that, with the exception of power supply, it is a self contained unit.

Safety clamps or mechanical supports 24,25,26,27 are pivotally mounted to the chassis and are biased such that in a default position the safety clamps are in the down position. This is shown in solid outline in FIG. 2. In order to move the safety clamps to the up position, as shown in dotted outline at 24*a*,25*a* in FIG. 2, it is necessary for the operator to send a signal to the device to raise the clamps. Safety guards 28,29 are mounted to the chassis to extend at least partly around the clamps when they are in the up position to reduce the possibility of the operators being caught by the clamps as they move to the down position. As shown in FIG. 2, safety clamps 24,27 are mounted on one side of the lifter and safety clamps 25,56 are mounted on the other side of the lifter.

The safety clamps are moved from the down position to the up position by way of a rotary actuator 30 connected to couplings 31. The couplings connect the actuator 30 to shafts 32 that are mounted to the chassis by way of plummer blocks and self aligning bearing assembly 34 (see FIG. 4). The rotary actuator may be an electric motor or a pneumatically driven motor. It will be appreciated that the actuator assembly is duplicated on the vacuum lifter in order to provide for control over both sets of safety clamps. It will also be understood that alternative means may be used to control movement of the safety clamps. For example, pneumatic or hydraulic cylinders may replace the actuator assembly.

As mentioned above, ancillaries such as vacuum reservoirs 35,36, battery box 37 and electrical cabinet 38 are mounted on the chassis. All required piping and control systems should also be mounted on the chassis, with only external power sources, such as air lines and electricity feeds, being required to be connected to the unit.

The vacuum lifter also includes vertical members 39,40 mounted to the chassis. The upper end of vertical members 39,40 in turn provide a mounting point for handling frame 41, which is connected to vertical members 39,40 by outwardly and upwardly extending members 42,43,44,45. Handling frame 41 enables operators to manipulate the device to a desired position with good accuracy. Furthermore, as handling frame 41 extends well beyond the lifting area of the vacuum lifter, the operators manipulating the device are placed well clear of the object being lifted, thus adding to the safety of the device.

The vacuum lifter also includes a closed ring 46 connected to member 47 which in turn is mounted to the chassis. Ring 46 is designed to couple with a crane hook to enable lifting of the device and the object to be lifted.

In operation of the lifter, the lifter is raised by a crane and positioned over a slab or other heavy object to be lifted. The safety clamps are moved to the up position and the lifter is then lowered until the suction cups rest on the top surface of the slab. Vacuum is then supplied to the suction cups and the crane subsequently lifts the slab. When the slab is sufficiently clear from the floor, for example: about 300 mm above the floor, the safety clamps are allowed to return to the down position in which they extend at least partly under the slab. This is best shown in FIG. 2, in which the slab 48 is shown in dotted outline, with lower parts 24*a* and 25*a* of safety clamps 24 and 25 extending partly under the slab.

In normal operation, the lifter and slab are moved by the crane to the desired place and a signal is sent by an operator to move the safety clamps to the up position. The lifter and slab are then lowered until the slab is in place and the vacuum supply to the suction cups released. The lifter is then removed from the slab.

As is clearly shown in FIG. 3, the only part of the lifter that extends beyond or around the slab being lifted are the safety clamps. When the safety clamps are in the up position, there is no part of the lifter extending beyond the slab in the plane of the slab. This allows for simple and accurate placement of the slab into the desired position.

Figure 5:
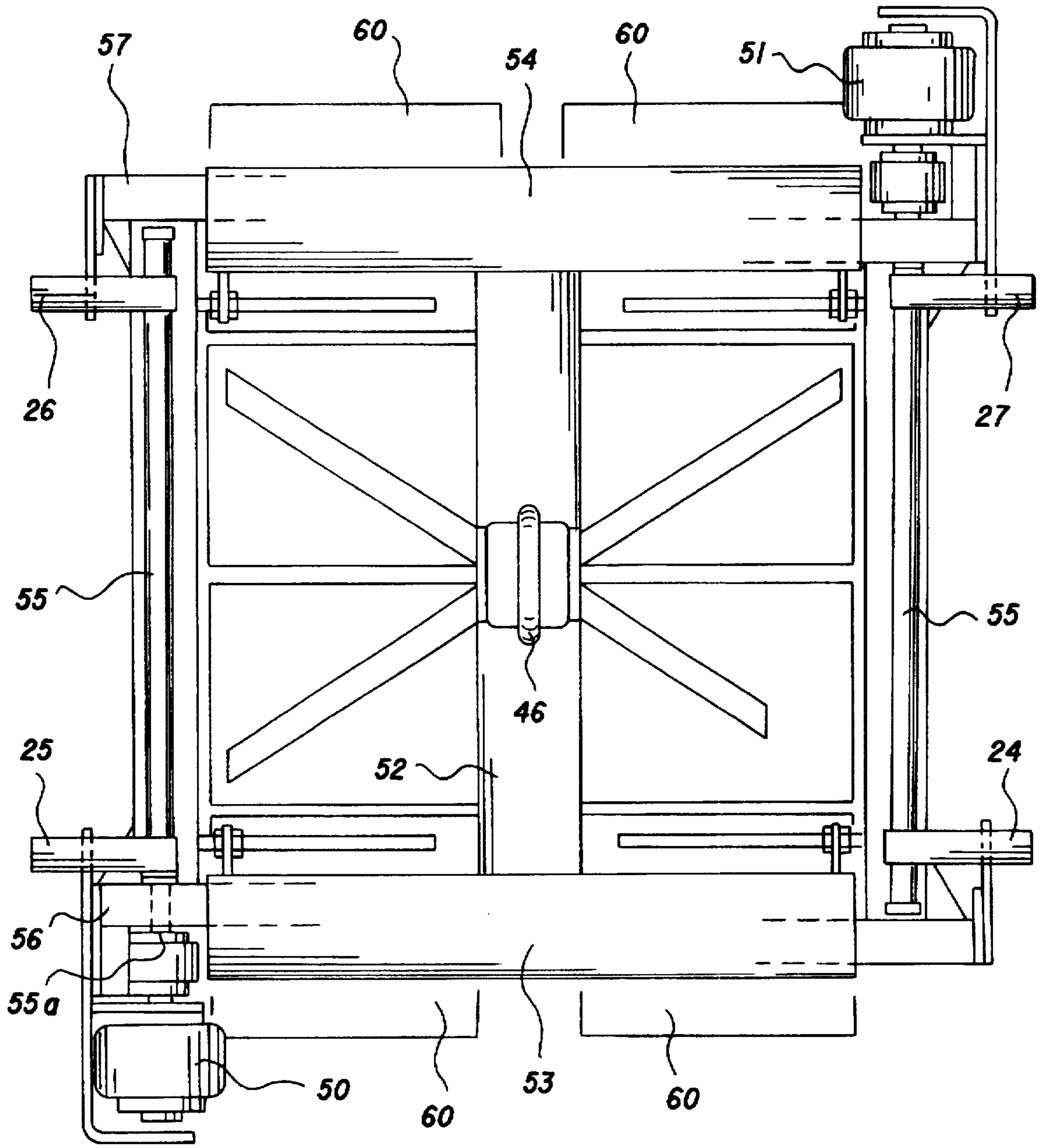
FIG. 5 is a partly fragmentary plan view of a vacuum lifter in accordance with the invention that incorporates a chassis having adjustable dimensions.
Figure 6:
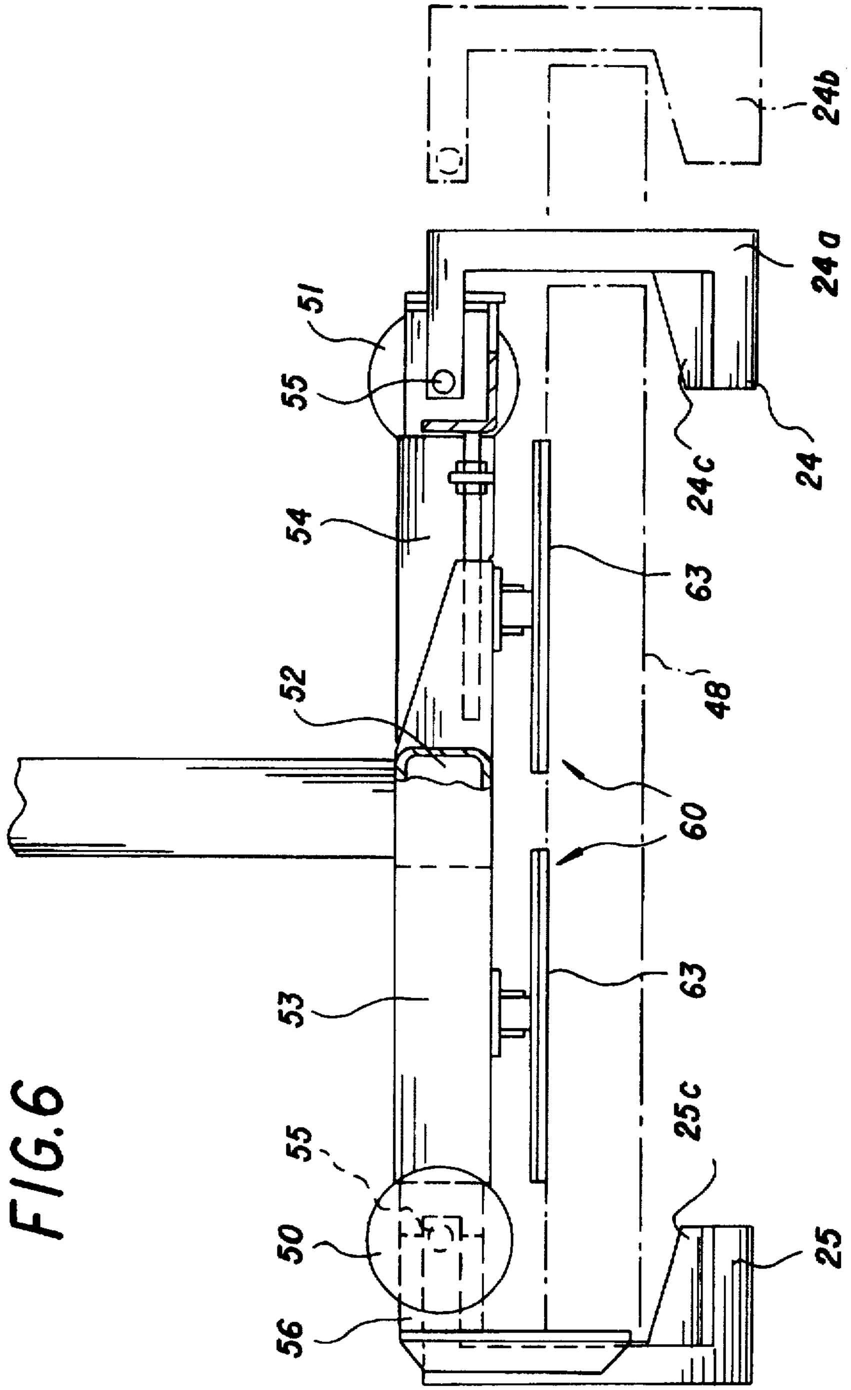
FIG. 6 is a side view of the lower part of the vacuum lifter shown in FIG. 5.

FIGS. 5 and 6 show a modification of the lifting device of the present invention which includes an adjustable chassis portion that enables the device to be used to lift slabs of different sizes. Such a device may be required, for instance, at an aluminium smelter having one potline with smelting cells of a first width and a second potline having smelting cells of a second width. This may occur in aluminium smelters that have had a second potline added as part of a major upgrade.

The lifting device shown in FIGS. 5 and 6 is generally similar to the lifting device shown in FIGS. 1 to 4 and similar parts are denoted by similar reference numerals.

As shown in FIG. 5, the lifting device of this embodiment includes safety clamps 24,27 mounted to one side of the lifter and safety clamps 25,26 mounted to the other side of the lifter. Actuators 50 and 51 are arranged to control the movement of the respective pairs of safety clamps. The chassis of the lifter includes central tube 52 having side tubes 53 and 54 connected thereto. Side tubes 53 and 54 include hollow portions that are able to slidably receive elongate elements.

The arrangement that allows the dimensions of the chassis to be altered will be explained with reference to the pair of safety clamps 25 and 26. Safety clamps 25 and 26 are connected by a common drive bar 55 which extends through the pivot point of each clamp. End 55*a* of drive bar 55 is connected to actuator 50 and the actuator acts to cause drive bar 55 to rotate, which of course results in the safety clamps moving up or down.

Drive bar 55 is also connected to extension rails 56 and 57. The connection of the drive bar 55 to the extension rails 56,57 is such that rotatable movement of the drive bar is possible. For example, the drive bar may be journalled in bearings mounted on the extension rails 56,57.

Extension rails 56,57 are mounted to the chassis of the lifter such that they extend into the hollow portions of respective side channels 53,54 of the chassis. The extension rails 56,57 are able to slide within the hollow portions of the side tubes 53,54 and this allows the safety clamps to be moved either inwardly or outwardly with respect to the chassis in order to accommodate lifting of slabs of different dimensions. If it is desired to lift a large slab, extension rails 56,57 are moved outwardly to move the safety clamps 25,26 away from the chassis. Once set to the desired spacing, the extension rails are fixed in place by any suitable means. The span between the pairs of safety clamps 25,26 and 24,27 has been effectively lengthened by this operation and the safety clamps can now extend around the periphery of the larger slab.

Adjustment and securing of the extension rails can be achieved by any convenient means. For example, the extension rails may be connected to actuators, such as pneumatic or hydraulic cylinders, mounted in the side tubes of the chassis. Alternatively, the extension rails may be connected to a rack and pinion drive mechanism. In a simple embodiment, the extension rails may have a series of holes drilled therethrough that are able to receive a pin inserted through a hole formed in the side tube. To adjust the length of the extension rail, the pin is withdrawn and the extension rail manually moved is either inwardly or outwardly. Once the desired length has been obtained, the pin is re-inserted in order to secure the extension rail.

It is preferred that the vacuum lifter shown in FIG. 5 is constructed such that safety clamps 24 and 27 are mounted to the chassis with a similar arrangement as that for safety clamps 25,26. This also allows the safety clamps 24,27 to be adjusted inwardly and outwardly.

It will be appreciated that although this embodiment has been described as including extension rails, it is not necessary that rails always be used to ensure the extensibility of the design and that any elongate members may be used as equivalents for the extension rails.

FIG. 6 shows the extent of movement of the safety clamp 24 from an innermost position 24*a* to an outermost position 24*b*. In this case, the safety clamp may be moved to a total of 200 mm in moving from position 24*a* to position 24*b*.

Also shown in FIG. 6 is a further modification that can accommodate lifting of slabs of different thickness. If a thinner slab is to be lifted, blocks 24*c*,25*c* are placed on respective safety clamps 24,25 in order to effectively bring the underlying part of the safety clamps closer to the bottom of the slab. The blocks 24*c*,25*c* can be simply removed in order to lift thicker slabs. It will be appreciated that the upper limit on the thickness of the slabs that can be lifted is governed by the length of the safety clamps and that if it is desired to lift slabs that have a thickness greater than this upper limit it will be necessary to replace the safety clamps with longer clamps.

The suction cups used in the present invention are preferably of a double sealed design as shown in FIG. 7. With reference to FIG. 7, a suction cup 60 includes backing plate 61 having a connection 62 capable of being connected to a source of vacuum. The cup includes a double sealing system that includes an outer seal 63 made from a closed cell polyurethane rubber and an inner seal 64 made from rubber. A double seal design is used to provide a more secure connection between the suction cup and the slab being lifted when vacuum is applied. The surface of the slab is generally rough and slightly porous. In order to compensate for this, the suction cups (or vacuum pads) utilise a soft outer seal 63 to take up the surface roughness of the slab and a hard inner seal 64 to reduce wear and tear on the outer seal and provide a secondary seal to the slab. Vacuum pads as shown in FIG. 7 have minimal leakage and allows at least two minutes of vacuum once the air supply is turned off.

It will be appreciated that the invention also extends to encompass the use of all suction cups known to a skilled addressee to be suitable for lifting heavy objects and are compatible with the surface characteristics of the object being lifted.

Control of the functions of the vacuum lifter is generally carried out by an operator at ground level. The operator uses a control pendant which is connected to the vacuum lifter by a control cable to control the operation of the vacuum lifter. The operator also gives instructions to the crane operator to provide for safe operation during lifting.

In order to more fully describe the safety features of the vacuum lifter, a description of the operating procedure lifter will be given.

The lifter control and alarms can be operated as outlined below.

(i) The operator at ground level shall connect any power supplies, or remove any parking attachments at the vacuum lifter parking station.

(ii) The crane hook shall be attached to the lifter with the assistance of an operator.

(iii) The operator shall direct the crane driver in the handling of the lifter, he shall also guide the travel of the lifter and any trailing power supply lines.

(iv) The operator guides the lifter (via the crane operator) into position over the slab to be lifted. The operator disengages the safety clamps on the skid* by pressing the dead-man push-button on the crane type pendant controller (pendant) and signals the crane operator to lower the lifter onto the slab. The operator actuates the vacuum attachment by pressing a momentary push-button (engage) on the pendant and confirms the successful attachment of the slab. When the vacuum pressure switches on both vacuum systems detect low enough vacuum to allow the crane to lift the slab a light visible to the crane operator shall turn on. The operator can signal the crane operator to lift the slab. When the lifter is lifted the operator releases the dead-man push-button to engage the safety clamps. With the slab in place on the lifter and the safety clamps engaged a light visible to the crane operator will turn on. With both lights on, the operator can signal the crane operator to carry the slab to its final destination.

(v) Lowering of the slab and lifter shall again be at the direction of the operator. When the slab is ready to be lowered onto the ground the operator presses the dead-man push-button on the pendant to disengage the safety clamps engaged light shall turn off. The operator directs the crane driver to lower the slab into position on the ground. The operator releases the vacuum attachment by pressing a momentary push-button (disengage) on the pendant and confirm the successful release of the slab. When the vacuum attachment is released the vacuum light shall turn off.

(vi) Once the vacuum light turns on (refer (iv) above) a latched interlock shall enable vacuum pressure switches on both vacuum systems to detect if the vacuum has deteriorated to a predetermined limit. If this occurs a siren will sound, the vacuum light shall turn off and a flashing light will turn on. A latched interlock will prevent disengaging of the safety clamps. The crane operator lowers the slab to the ground immediately. A key operated override on the pendant is required to release the safety clamps, turn the siren off, turn the flashing light off and reset the interlocks.

The control and alarm functions preferably operate independently from the source of power to the vacuum systems. The power to the control and alarms may be by rechargeable battery power pack. The power pack should provide a minimum of eight hours operating time for all control and alarm functions from fully charged.

The vacuum lifting device of the present invention provides a lifting device that allows simple and accurate placement of large, heavy objects. The unit includes a number of safety systems and redundancies that provides a high degree of safety and makes the unit suitable for use in a plant environment.

The vacuum lifter of the present invention is especially suitable for placing refractory slabs into aluminium smelting cells during re-lining of the cells. Use of the vacuum lifter has resulted in a cell of the applicant's Bell Bay smelter being lined with a refractory lining in 15 minutes. Three operators are required, meaning that 45 man minutes are used. By way of comparison, lining the same cell with a refractory layer of slabs using mechanical lifters requires 4 man hours. Placing a refractory brick lining in the cell requires 32 man hours. The productivity gains from using the vacuum lifter of the invention are evident.

For vacuum lifters designed for use in aluminize smelters, it is preferred that the lifter be manufactured using stainless steel in order to avoid difficulties with the large magnetic field found in the operating potlines of such smelters. Solenoid valves and other parts should also be designed to minimise the effect of magnetic fields on their operation. This will enable the smelting pots to be re-fitted in the potline.

Those skilled in the art will appreciate that the invention described herewith in susceptible to variations and modifications other than those specifically described. It is to be understood that the present invention includes all such variations and modifications that fall within its spirit and scope.

We claim:

1. A vacuum lifting device for lifting heavy objects comprising a first set of suction cups connected to a source of vacuum, said first set of suction cups adapted to be placed in engagement with a surface of an object to be lifted and to releasably connect to the object when vacuum is applied to the first set of suction cups, a plurality of mechanical supports operable in use to move from a first position wherein said mechanical supports are clear of the object being lifted to a second position wherein said mechanical supports extend at least partly underneath the object when said object is lifted, said mechanical supports being capable of holding said object in the event of vacuum failure, mechanical support control means to operate said mechanical supports from the first position to the second position after said object is lifted and to retract the mechanical supports prior to releasing the object, safety control means including monitoring means for monitoring the level of vacuum in the suction cups and automatic position control means to position the mechanical supports in the second position if the monitored level of vacuum in the suction cups falls below a predetermined level said device being adapted to be connected to or being operatively connected to lifting means.

2. A vacuum lifting device according to claim 1 wherein the automatic position control means includes position determining means to determine the position of the mechanical supports and means to position the mechanical supports in the second position if the position determining means determines that the mechanical supports are not in the second position, said automatic position control means being operable to maintain the mechanical supports in the second position if the position determining means determines that the mechanical supports are in the second position.

3. A vacuum lifting device according to claim 1 wherein said device further includes a second set of suction cups connected to a second source of vacuum, said second set of suction cups being adapted to be placed in engagement with a surface of the object to be lifted and to releasably connect to the object when vacuum is applied to the second set of suction cups.

4. A vacuum lifting device according to claim 3 wherein one or both sets of suction cups are connected to a reservoir of vacuum pressure, which reservoir has sufficient vacuum capacity to enable the suction cups to continue holding the object for a period of time sufficiently long to enable the object to be lowered in the event of a failure in the vacuum supply.

5. A vacuum lifting device according to claim 4 wherein each set of suction cups is connected to a separate reservoir of vacuum.

6. A vacuum lifting device according to claim 4 wherein said reservoir comprises an accumulator.

7. A vacuum lifting device according to claim 1 which includes a chassis to which said mechanical supports and suction cups are mounted.

8. A vacuum lifting device according to claim 7 wherein said chassis is adjustable in size.

9. A vacuum lifting device according to claim 8 wherein the chassis includes an adjustable portion and the mechanical supports are mounted to the adjustable portion.

10. A vacuum lifting device according to claim 9 wherein the adjustable portion of the chassis includes one or more adjustable members mounted for telescoping movement relative to one or more respective fixed members.

11. A vacuum lifting device according to claim 1 wherein each mechanical support comprises an L-shaped or a C-shaped member pivotally mounted to said vacuum lifting device.

12. A vacuum lifting device according to claim 1 wherein drive means move the mechanical supports from the second position to the first position.

13. A vacuum lifting device in accordance with claim 12 wherein said drive means comprises one or more pneumatic actuators or pneumatic cylinders.

14. A vacuum lifting device as claimed in claim 13 wherein the one or more pneumatic actuators or pneumatic cylinders are connected to an air supply including an air reservoir.

15. A vacuum lifting device according to claim 1 wherein the mechanical supports are arranged in two sets on opposing sides of said vacuum lifting device, each mechanical support of a set being connected to a common drive bar, and wherein actuation of said drive means causes rotational movement of said drive bar to thereby move said mechanical supports of said set between the first and second positions.

16. A vacuum lifting device according to claim 1 wherein the mechanical support control means includes a dead-man button that must be pressed to drive the mechanical supports from the second position to the first position.

17. A vacuum lifting device according to claim 1 wherein the mechanical supports are positioned in the second position in a default position or in an unpowered state.

18. A vacuum lifting device according to claim 1 wherein said device includes a ring for attachment to a crane hook.

19. A vacuum lifting device according to claim 1 wherein said first set of suction cups is connected to a reservoir of vacuum pressure, which reservoir has sufficient vacuum capacity to enable the suction cups to continue holding the object for a period of time sufficiently long to enable the objects to be lowered in the event of a failure in the vacuum supply.

20. A vacuum lifting device for lifting heavy objects comprising a first set of suction cups connected to a source of vacuum, said first set of suction cups adapted to be placed in engagement with a surface of an object to be lifted and to releasably connect to the object when vacuum is applied to the first set of suction cups, a second set of suction cups connected to a second source of vacuum, said second set of suction cups being adapted to be placed in engagement with a surface of the object to be lifted and to releasably connect to the object when vacuum is applied to the second set of suction cups, a plurality of mechanical supports operable in use to move from a first position wherein said mechanical supports are clear of the object being lifted to a second position wherein said mechanical supports extend at least partly underneath the object when said object is lifted, said mechanical supports being capable of holding said object in the event of vacuum failure, mechanical support control means to operate said mechanical supports from the first position to the second position after said object is lifted and to retract the mechanical supports prior to releasing the object, said device being adapted to be connected to or being operatively connected to lifting means.

21. A vacuum lifting device according to claim 20, wherein one or both sets of suction cups are connected to a reservoir of vacuum pressure, which reservoir has sufficient vacuum capacity to enable the suction cups to continue holding the object for a period of time sufficiently long to enable to object to be lowered in the event of a failure in the vacuum supply.

22. A vacuum lifting device according to claim 21 wherein each set of suction cups is connected to a separate reservoir of vacuum.

23. A vacuum lifting device according to claim 22, wherein said reservoir comprises an accumulator.

24. A vacuum lifting device according to claim 21, wherein said reservoir comprises an accumulator.

25. A vacuum lifting device according to claim 20 which includes a chassis to which said mechanical supports and suction cups are mounted.

26. A vacuum lifting device according to claim 25 wherein said chassis is adjustable in size.

27. A vacuum lifting device according to claim 26 wherein the chassis includes an adjustable portion and the mechanical supports are mounted to the adjustable portion.

28. A vacuum lifting device according to claim 27 wherein the adjustable portion of the chassis includes one or more adjustable members mounted for telescoping movement relative to one or more respective fixed members.

29. A vacuum lifting device according to claim 20 wherein each mechanical support comprises an L-shaped or a C-shaped member pivotally mounted to said vacuum lifting device.

30. A vacuum lifting device according to claim 29 wherein drive means move the mechanical supports from the second position to the first position.

31. A vacuum lifting device in accordance with claim 30 wherein said drive means comprises an air actuator or a pneumatic cylinder.

32. A vacuum lifting device according to claim 31 wherein the mechanical supports are arranged in two sets on opposing sides of said vacuum lifting device, each mechanical support of a set being connected to a common drive bar, and wherein actuation of said drive means causes rotational movement of said drive bar to thereby move said mechanical supports of said set between the first and second positions.

33. A vacuum lifting device according to claim 30 wherein the mechanical supports are arranged in two sets on opposing sides of said vacuum lifting device, each mechanical support of a set being connected to a common drive bar, and wherein actuation of said drive means causes rotational movement of said drive bar to thereby move said mechanical supports of said set between the first and second positions.

34. A vacuum lifting device for lifting heavy objects comprising a first set of suction cups connected to a source of vacuum, said first set of suction cups adapted to be placed in engagement with a surface of an object to be lifted and to releasably connect to the object when vacuum is applied to the first set of suction cups, a plurality of mechanical supports operable in use to move from a first position wherein said mechanical supports are clear of the object being lifted to a second position wherein said mechanical supports extend at least partly underneath the object when said object is lifted, said mechanical supports being capable of holding said object in the event of vacuum failure, drive means for moving the mechanical supports from the second position to the first position, wherein said drive means comprises one or more air actuators or pneumatic cylinders connected to an air supply line including an air reservoir, mechanical support control means to operate said mechanical supports from the first position to the second position after said object is lifted and to retract the mechanical supports prior to releasing the object, said device being adapted to be connected to or being operatively connected to lifting means.

35. A vacuum lifting device according to claim 34 wherein the mechanical supports are arranged in two sets on opposing sides of said vacuum lifting device, each mechanical support of a set being connected to a common drive bar, and wherein actuation of said drive means causes rotational movement of said drive bar to thereby move said mechanical supports of said set between the first and second positions.

36. A vacuum lifting device according to claim 35 wherein the mechanical support control means includes a dead-man button that must be pressed to drive the mechanical supports from the second position to the first position.

37. A vacuum lifting device according to claim 35 wherein the mechanical supports are positioned in the second position in a default position or in an unpowered state.

38. A vacuum lifting device according to claim 34 wherein the mechanical support control means includes a dead-man button that must be pressed to drive the mechanical supports from the second position to the first position.

39. A vacuum lifting device according to claim 38 wherein the mechanical supports are positioned in the second position in a default position or in an unpowered state.

40. A vacuum lifting device according to claim 34 wherein the mechanical supports are positioned in the second position in a default position or in an unpowered state.

* * * * *